(12) United States Patent
Bilcu et al.

(10) Patent No.: US 7,796,830 B2
(45) Date of Patent: Sep. 14, 2010

(54) ADAPTIVE CONTRAST OPTIMIZATION OF DIGITAL COLOR IMAGES

(75) Inventors: Radu Bilcu, Tampere (FI); Markku Vehvilainen, Tampere (FI)

(73) Assignee: Nokia Corporation, Espoo (FI)

( * ) Notice: Subject to any disclaimer, the term of this patent is extended or adjusted under 35 U.S.C. 154(b) by 1065 days.

(21) Appl. No.: 11/464,645

(22) Filed: Aug. 15, 2006

(65) Prior Publication Data

US 2008/0044083 A1    Feb. 21, 2008

(51) Int. Cl.
*G06K 9/40* (2006.01)
*G06K 9/00* (2006.01)
*H04N 1/40* (2006.01)

(52) U.S. Cl. .................. 382/274; 382/168
(58) Field of Classification Search .......... 382/128, 382/162, 164, 167, 168, 172, 173, 254, 274, 382/276, 277, 299; 348/224.1, 229.1, 294, 348/301, 674, E5.036, E17.002; 396/99, 396/245, 251, 259; 600/443
See application file for complete search history.

(56) References Cited

U.S. PATENT DOCUMENTS

| | | | | | |
|---|---|---|---|---|---|
| 4,074,289 | A | * | 2/1978 | Nobusawa | 396/245 |
| 4,174,526 | A | * | 11/1979 | Geurts | 348/229.1 |
| 4,264,163 | A | * | 4/1981 | Hickok et al. | 396/251 |
| 4,550,993 | A | * | 11/1985 | Taniguchi et al. | 396/99 |
| 5,049,730 | A | * | 9/1991 | Loveland | 250/214 VT |
| 5,157,501 | A | * | 10/1992 | No et al. | 348/294 |
| 5,467,404 | A | | 11/1995 | Vuylsteke | |
| 5,954,653 | A | * | 9/1999 | Hatfield et al. | 600/443 |
| 7,474,847 | B2 | * | 1/2009 | Nikkanen et al. | 396/213 |
| 7,522,781 | B2 | * | 4/2009 | Lee et al. | 382/274 |
| 7,583,297 | B2 | * | 9/2009 | Yamada | 348/224.1 |
| 2003/0160882 | A1 | * | 8/2003 | Henno et al. | 348/301 |
| 2008/0044083 | A1 | * | 2/2008 | Bilcu et al. | 382/168 |

OTHER PUBLICATIONS

Dah-Chung Chang, Wen-Rong Wu—"Image Contrast Enhancement Based on a Histogram Transformation of Local Standard Deviation", in IEEE Transactions on Medical Imaging, vol. 17, No. 4, Aug. 1998, pp. 518-531.

Hayit Greenspan, Charles H. Anderson and Sofia Akber,—"Image Enhancement by Nonlinear Extrapolation in Frequency Space", in IEEE Transactions on Image Processing, vol. 9, No. 6, Jun. 2000, pp. 1035-1048.

Yeong-Taeg Kim,—"Contrast Enhancement Using Brightness Preserving Bi-Histogram Equalization", in IEEE Transactions on Consumer Electronics, vol. 43, No. 1, Feb. 1997, pp. 1-8.

(Continued)

*Primary Examiner*—Amir Alavi
(74) *Attorney, Agent, or Firm*—Banner & Witcoff, Ltd.

(57) ABSTRACT

Methods and systems are provided for adjusting the contrast and intensity of digital images. Digital images may be processed by first creating a histogram that identifies the intensity of components of the digital image. A transformation function is then computed using the histogram. The transformation function can be used to adjust the intensity of a low light portion of the digital image and is applied to individual color components of the digital image. Finally, the contrast of a portion of the digital image other than the low light portion of the digital image is adjusted.

21 Claims, 6 Drawing Sheets

OTHER PUBLICATIONS

Sarif Kumar and C. A. Murthy,—"Hue-Preserving Color Image Enhancement without Gamut Problem", in IEEE Transactions on Image Processing, vol. 12, No. 12, Dec. 2003, pp. 1591-1598.

Joung-Youn Kim, Lee-Sup Kim and Seung-Ho Hwang,—"An Advanced Contrast Enhancement using Partially Overlapped Sub-Block Histogram Equalization", in IEEE transactions on Circuits and Systems for Video Technology, vol. 11, No. 4, Apr. 2001, pp. 475-484.

Jinshan Tang, Eli Peli and Scott Acton,—"Image Enhancement Using a Contrast Measure in the Compressed Domain", in IEEE Signal Processing Letters, vol. 10, No. 10, Oct. 2003, pp. 289-292.

M. A. Wirth and D. Nikitenko,—"Applications of Fuzzy Morphology to Contrast Enhancement", in IEEE Annual Meeting of the North American Fuzzy Information Processing Society, NAFIPS2005, pp. 355-360.

Jian Lu and Denis M. Healy, Jr,—"Contrast Enhancement Via Multiscale Gradient Transformation", in Proceedings of IEEE International Conference on Image Processing ICIP1994, pp. 482-486.

KokKeong Tan and John P. Oakley,—"Enhancement of Color Images in Poor Visibility Conditions", In Proceedings of IEEE International Conference on Image Processing ICIP2000, pp. 788-791.

* cited by examiner

ADAPTIVE CONTRAST OPTIMIZATION OF DIGITAL COLOR IMAGES

FIELD OF INVENTION

The invention relates to the processing of digital images. More particularly, aspects of the invention relate to systems and methods for adjusting the contrast and intensity of digital images.

BACKGROUND

It has become common for portable devices, such as mobile terminals, to include digital cameras. Mobile terminals equipped with cameras allow users to capture images and video and then transmit the captured video and images to remote locations. Because of the size limitations placed on cameras and sensors that are part of mobile terminals, it is common for captured images to have poor quality. In particular, contrast and intensity levels are often set at levels that result in poor image quality.

Scenes that contain both dark and bright sections often result in poor contrast and intensity levels, particularly when automatic settings are used. The camera exposure time is set for a short time period to minimize the number of saturated pixels. The short exposure time causes some parts of the image to have low intensity and contrast. Short exposure times may also be set manually to capture moving objects without blurring. Images captured with manually set short exposure times may have similar intensity and contrast limitations.

There is a need in the art for improved systems and methods for processing digital images to correct intensity and/or contrast levels.

SUMMARY

Embodiments of the present invention address one or more of the problems described above by providing systems and methods for correcting intensity and contrast levels of digital images while providing large dynamic range and minimizing contrast distortion. In one embodiment, an intensity image that identifies the intensity of pixels of an input image is first computed. A histogram of the intensity image is then created. Next, a transformation function is computed using the histogram. The transformation function is computed such that it can be used to adjust the intensity of a low light portion of the digital image. The transformation function is then applied to individual color components of the digital image. Finally, the contrast of a portion of the digital image other than the low light portion of the digital image is adjusted.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
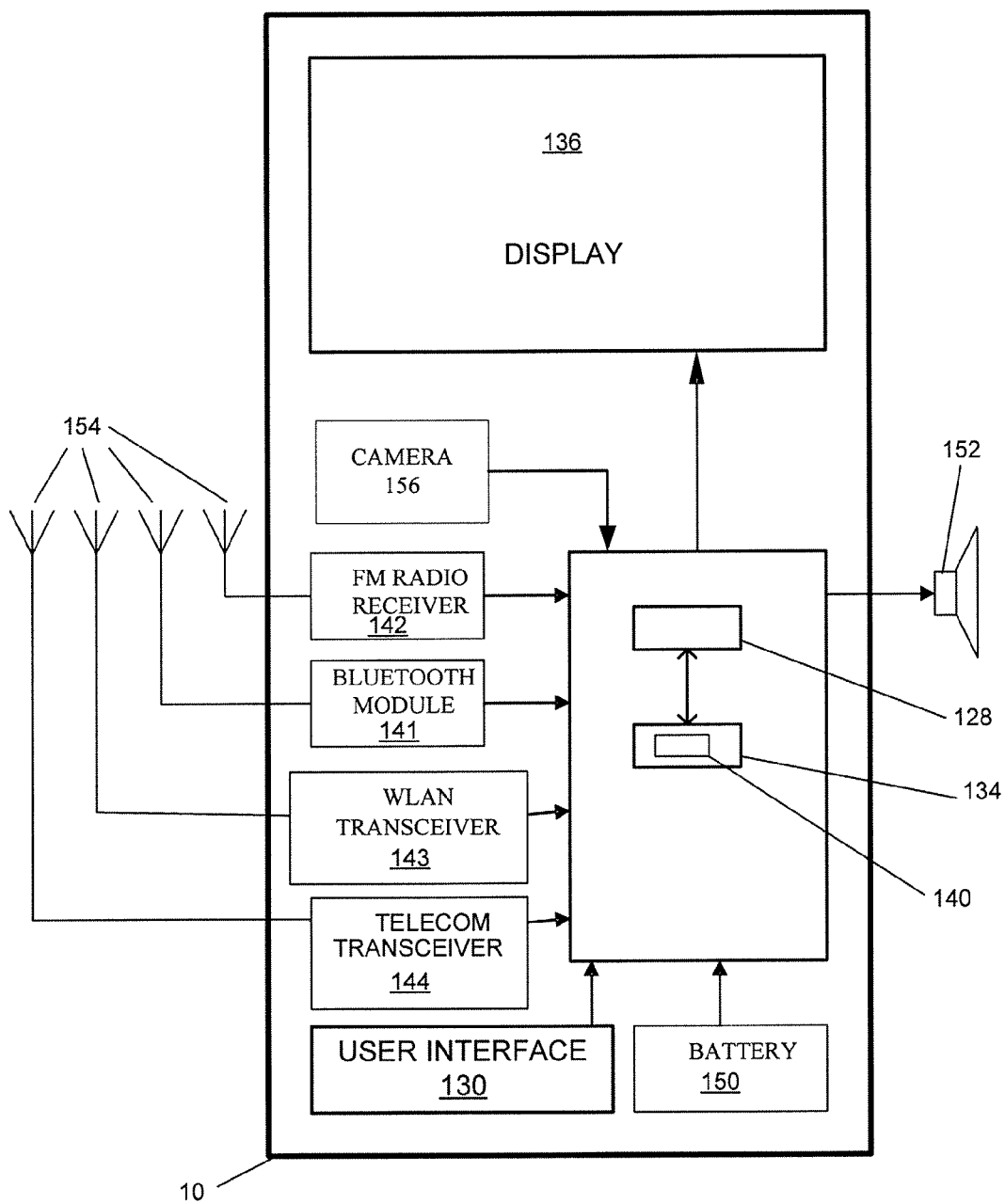
FIG. 1 illustrates an exemplary mobile terminal that may be used to implement aspects of the present invention.

Aspects of the invention may be implemented with digital cameras and devices that include digital cameras. Devices that include digital cameras include mobile terminals and portable computer devices. FIG. 1 illustrates an exemplary mobile terminal 10 that may be used to implement aspects of the invention. As shown in FIG. 1, a mobile terminal 10 may include a processor 128 connected to a user interface 130, a memory 134 and/or other storage, a display 136 and a camera 156. Mobile terminal 10 may also include a battery 150, a speaker 152 and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile terminal 10 may be stored in computer readable memory 134. Memory 134 may be implemented with any combination of read only memory modules or random access memory modules, optionally including both volatile and nonvolatile memory and optionally being detachable. Software 140 may be stored within memory 134 and/or storage to provide instructions to processor 128 for enabling mobile terminal 10 to perform various functions. Alternatively, some or all of mobile terminal 10 computer executable instructions may be embodied in hardware or firmware (not shown).

Mobile terminal 10 may be configured to send and receive transmissions based on the Bluetooth standard, through a specific Bluetooth module 141. Additionally, mobile terminal 10 may also be configured to receive, decode and process transmissions through an FM/AM radio receiver 142, a wireless local area network (WLAN) transceiver 143, and a telecommunications transceiver 144. In one aspect of the invention, mobile terminal 10 may receive radio data stream (RDS) messages. Mobile terminal 10 may be equipped with other receivers/transceivers, e.g., one or more of a Digital Audio Broadcasting (DAB) receiver, a Digital Radio Mondiale (DRM) receiver, a Forward Link Only (FLO) receiver, a Digital Multimedia Broadcasting (DMB) receiver, etc. Hardware may be combined to provide a single receiver that receives and interprets multiple formats and transmission standards, as desired. That is, each receiver in a mobile terminal device may share parts or subassemblies with one or more other receivers in the mobile terminal device, or each receiver may be an independent subassembly.

Figure 2:
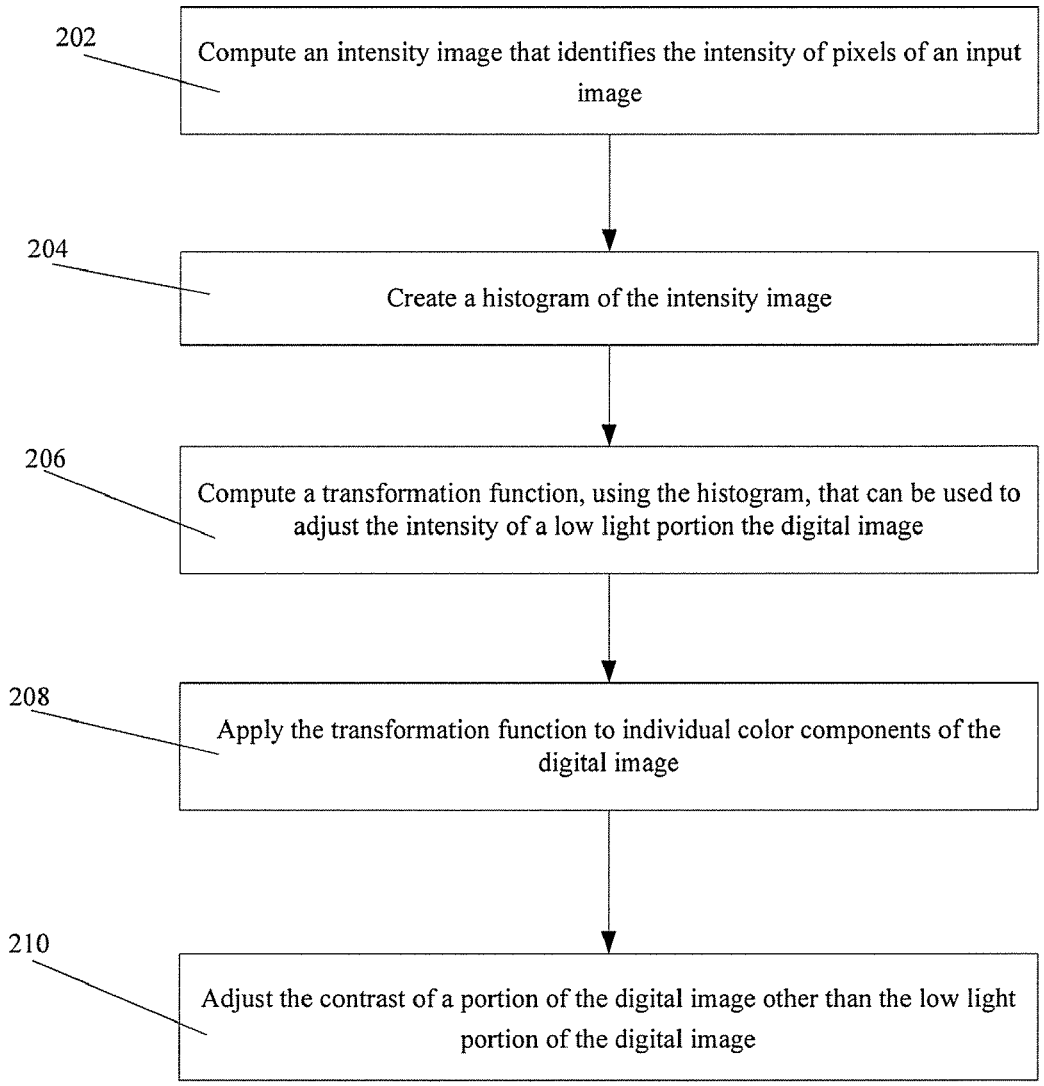
FIG. 2 illustrates a method of processing digital images in accordance with an embodiment of the invention.

FIG. 2 illustrates a method of processing digital images in accordance with an embodiment of the invention. First, in step 202 and intensity image that identifies the intensity of pixels of an input image is computed. The input image may be in a compressed or uncompressed RGB format such as JPEG and TIFF. In some embodiments the input image may be in the form of unprocessed data received from an image sensor of a digital camera. The intensity image may be computed using the following formula:

$$y(i, j) = \frac{r(i, j) + b(i, j) + g(i, j)}{3} \quad (1)$$

where i identifies a pixel row, j identifies a pixel column. The intensity of individual red, green and blue pixels are identified by r(i,j), g(i,j) and b(i,j) respectively.

Figure 3:
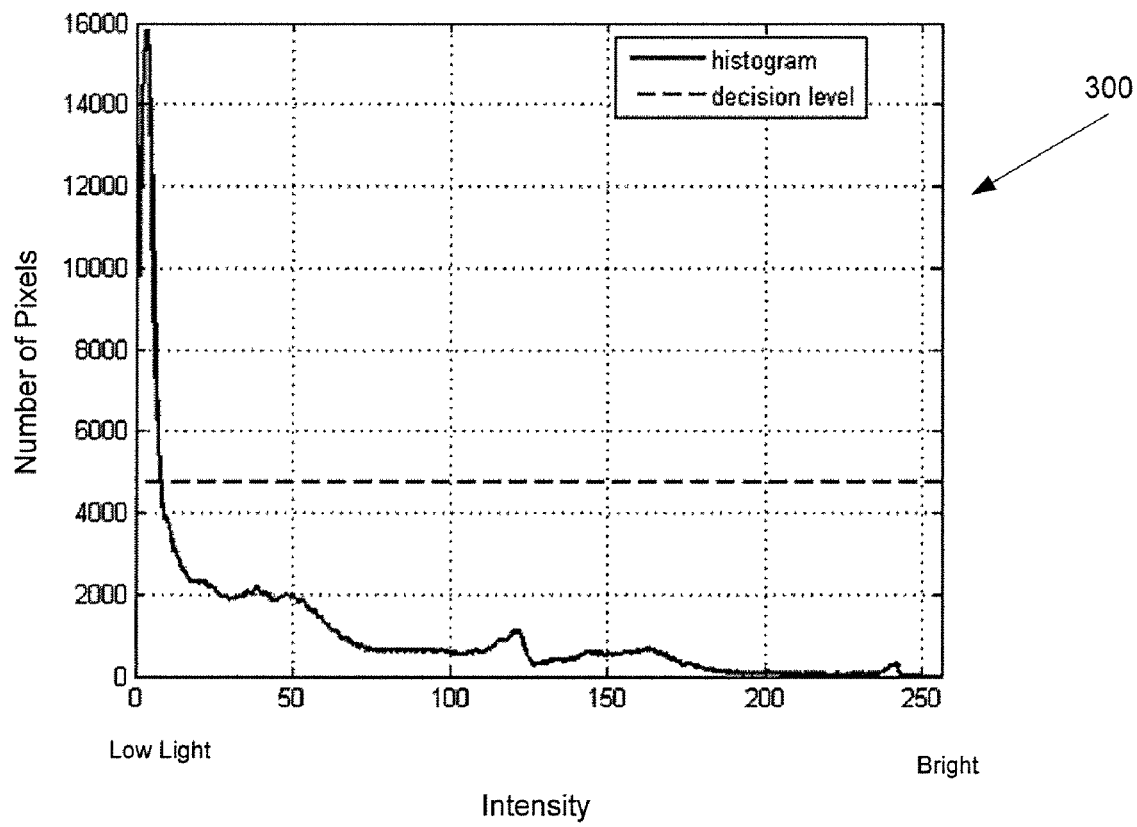
FIG. 3 illustrates an exemplary histogram that includes intensity data of an intensity image in accordance with an embodiment of the invention.

Next, in step 204 a histogram of the intensity image is created. The type of histogram created in step 204 may be a conventional histogram used in connection with the processing of typical digital images. FIG. 3 illustrates an exemplary histogram 300 that includes intensity data of an intensity image. As is known in the art, the quantities of low light pixels are shown toward the left of the histogram and the quantities of bright pixels are shown toward the right. Histogram 300 corresponds to an image having a large number of low light or dark pixels and relatively few bright pixels.

In one embodiment, the histogram created in step 204 may be defined as follows:

$$h(m) = nr \text{ of pixels in the range } [m-0.5; m+0.5] \text{ with } m=0, \ldots, 255 \quad (2)$$

Figure 4:
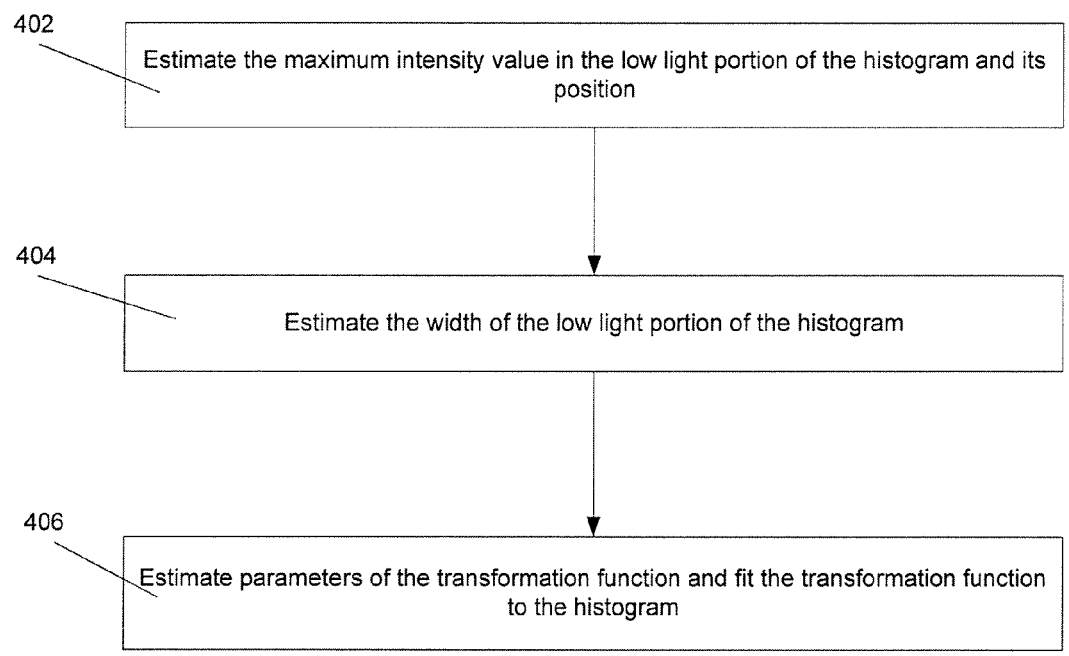
FIG. 4 illustrates an exemplary method that may be used to compute a transformation function in accordance with an embodiment of the invention.

In step 206 a transformation function is computed to adjust the intensity of a low light portion of the digital image. The computation performed in step 206 may use the histogram created in step 204. FIG. 4 illustrates an exemplary method that may be used to compute the transformation function. First, in step 402 the maximum intensity value MAX in the low light portion of the histogram and its position M are estimated. In one embodiment:

$$MAX = \max_{m=1,\ldots,128} \{h(m)\} \quad (3)$$

and $$M = \{m = 1, \ldots, 128 | h(m) = MAX\}$$

In this manner the maximum number of pixels that are in the low light portion of the image and the corresponding number of pixels are found. The position M in the histogram corresponds to the value MAX. The low light portion of the histogram is analyzed so that the intensity and contrast of dark regions of the image can be adjusted.

In step 404, the width of the low light portion of the histogram is estimated. Step 404 may be used to determine the portion of the low light region containing the most pixels. In one embodiment, a threshold value, such as 0.3, is selected and the range of the histogram [Imin,Imax] is computed as:

$$\text{low} = \{m = 1, \ldots, M | h(m) > 0.3\text{MAX}\} \quad (4)$$

and $$R1 = \min_{m} \{\text{low}\}$$

$$\text{high} = \{m = M, \ldots, 128 | h(m) > 0.3\text{MAX}\} \quad (5)$$

and $$R2 = \max_{m} \{\text{high}\}$$

$$I\text{min} = M - \max\{|M-R1|, |M-R2|\} \text{ and } I\text{max} = M + \max\{|M-R1|, |M-R2|\} \quad (6)$$

Input images that have a large number of dark pixels that have almost the same intensity level will result in a small range (Imin and Imax will be close to each other). The amount of processing that ultimately takes place is inversely related to the range. Input images having large ranges already have a large dynamic range and require less processing. In some embodiments the maximum and the minimum strength of the processing are limited in order to limit over-processing or smoothing the input image.

Finally, in step 406 parameters of the transformation function are estimated and the transformation function is fit to the histogram. The transformation function may be fitted to the range [Imin,Imax] determined above. In one embodiment, the transformation function f(i,j) is defined as $$f(i, j) = \frac{255}{1 + \exp\left(-\frac{K(y(i, j) - M)}{255}\right)} \quad (7)$$

Figure 5:
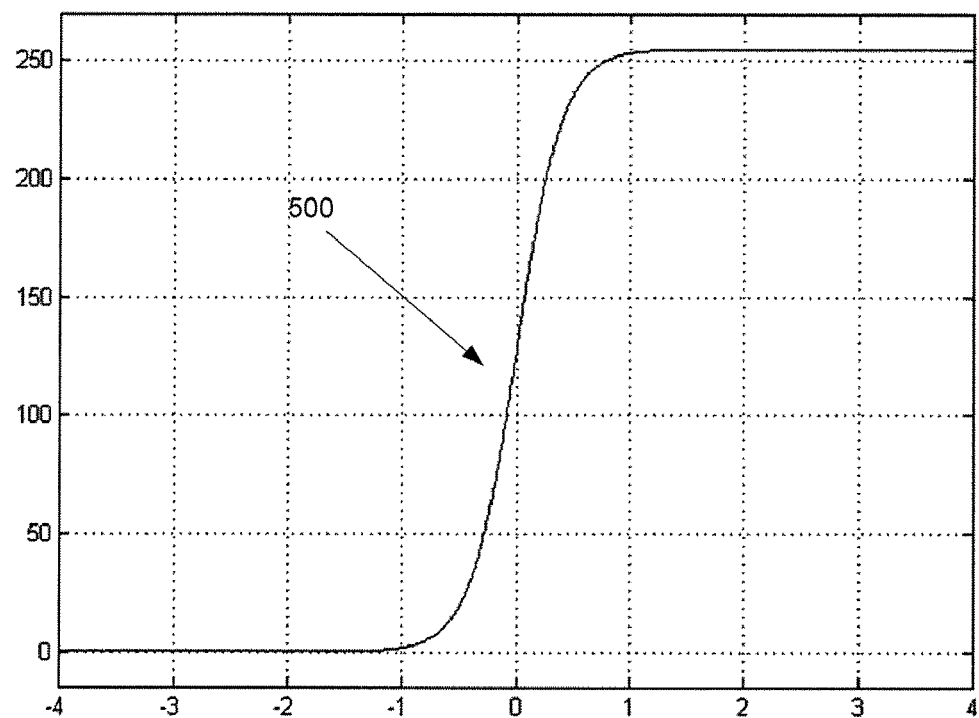
FIG. 5 illustrates an exemplary transformation function in accordance with an embodiment of the invention.

A scaling factor of 255 is used to normalize the intensity pixel values in the range [−1,1]. FIG. 5 illustrates an exemplary transformation function 500. The maximum slope exists for inputs in the range [−1,1] and this is the reason why the pixel values must be scaled. Subtracting the maximum intensity position M shifts the center of the correction function to the position of the maximum of the histogram.

The value K in equation can result in saturation at the zero level or the 255 level if not chosen properly. A very large value of K for a transformation function enhance the contrast of the pixels that have values close to M but the other pixels will be simply put to 0 or 255. That is all pixels not located close to M will be black or white. K may have a non-fixed value when there is a desire for high contrast while avoiding over saturation. A wide range [Imin,Imax] may result in a small K that prevents saturation of the other pixels and also decrease the strength of the processing. A narrow range [Imin,Imax] may result in a larger K in order to better increase the contrast and intensity. However in any case the pixels that are at the extreme value of the intensity (around 0 and around 255 intensity levels) should not be saturated.

In one embodiment, to compute the value of the parameter K we start from the following condition imposed on the transformation function f(i,j):

$$f(I\text{max}) = 0.7 * 255 \quad (8)$$

This value ensures a remaining dynamic range of 0.3*255 for pixels that are situated around 0 levels and also around 255 level. Solving equation (8) for K results in the following formula for adaptively selecting the value of this parameter:

$$K = \frac{-255\ln\left(\frac{1-0.7}{0.7}\right)}{Imax - M} = \frac{-255\ln(0.43)}{Imax - M} \quad (9)$$

The scaling factor 255 ensures that the pixels after applying the correction function are on the range [0,255]. In some situations the value of the parameter K, estimated by equation (9), can be too large or to small. In such situations its value should be bounded. An exemplary minimum value Kmin equals 3 and an exemplary maximum value K max $\in$[8,10]. The fixed value Kmin may be chosen such that the transformation function f(i,j) is linear inside the input range [−1,1]. The maximum value of K can be selected fixed or it can be a user defined parameter. Modifications to Kmax can increase or decrease the maximum strength of the processing.

Returning to FIG. 2, in step 208 the transformation function is applied to individual color components of the digital image. In one implementation, for the red component r(i,j), the minimum and maximum values of r(i,j) are determined so that they may be preserved as follows:

$$\min\_r = \min_{i,j}(r(i,j)) \quad (10)$$

$$\max\_r = \max_{i,j}(r(i,j))$$

Correction may then be performed as follows:

$$\hat{r}(i,j) = \frac{\max\_r}{1 + \exp\left(-\frac{K(r(i,j)-M)}{255}\right)} \quad (11)$$

The minimum and the maximum pixel values of the red color component may be restored as follows:

$$\hat{r}(i,j) = \hat{r}(i,j) - \min\_r \quad (12)$$

$$\hat{r}(i,j) = \frac{\max\_r - \min\_r}{\max(\hat{r}(i,j))}\hat{r}(i,j)$$

$$\hat{r}(i,j) = \hat{r}(i,j) + \min\_r$$

During the correction phase, some pixels from the high intensity part of the input image may be over processed. Over saturation can be corrected by using a weighted average, such as:

$$\hat{r}(i,j) = (1 - a(i,j))\hat{r}(i,j) + a(i,j)r(i,j) \quad (13)$$

With a(i,j) being a weighting function computed as follows:

$$a(i,j) = \begin{cases} 0 & \text{if } r(i,j) < M \\ \frac{f(y(i,j)) - 0.5}{255} & \text{otherwise} \end{cases} \quad (14)$$

The processing described above with respect to red may then be repeated for other color components, such as green and blue.

Finally, in step 210 the contrast of a portion of the digital image other than the low light portion of the digital image is adjusted. In one embodiment, step 210 includes modifying the level of the local contrast, but not the intensity. The transformation function f(i,j) may be used to indicate which pixels were processed in the previous steps.

The contrast of a portion of the digital image other than the low light portion of the digital image may be adjusted by first computing a gain map g(i,j) according to:

$$g(i,j) = \frac{1}{1 + \exp\left(-\frac{K(r(i,j)-M)}{255}\right)} \quad (14)$$

$$g(i,j) = g(i,j) - \min(g(i,j))$$

$$g(i,j) = \frac{g(i,j)}{\max(g(i,j))} + 1$$

In one implementation, a maximum value of the gain map is 2 and it is obtained for the pixels that were not processed at previous steps. Of course a maximum value larger than 2 can be used in order to have a stronger contrast processing. In an alternative embodiment, the maximum value of the gain can also be selected as a user defined parameter which can be used to fine tune the processing quality.

Vertical and horizontal sums and differences may be computed as follows:

$$d1 = \hat{r}(i,j) - \hat{r}(i+1,j)$$

$$s1 = \hat{r}(i,j) + \hat{r}(i+1,j)$$

$$d2 = \hat{r}(i,j) - \hat{r}(i,j+1)$$

$$s1 = \hat{r}(i,j) + \hat{r}(i,j+1) \quad (15)$$

Next, the portion of the digital image other than the low light portion of the digital image may be adjusted by multiplication of the differences with the gain map as follows:

$$\hat{d}1(i,j) = g(i,j)d1(i,j)$$

$$\hat{d}2(i,j) = g(i,j)d2)(i,j) \quad (16)$$

The image may then be reconstructed according to:

$$Rout(i,j) = \frac{\hat{d}1(i,j) + \hat{d}2(i,j) + s1(i,j) + s2(i,j)}{4} \quad (17)$$

Finally, image clipping may be performed according to:

$$Rout(i,j) = \begin{cases} 0 & \text{if } Rout(i,j) < 0 \\ 255 & \text{if } Rout(i,j) > 255 \\ Rout(i,j) & \text{otherwise} \end{cases} \quad (18)$$

The remaining color components may be processed using similar procedures.

Figure 6A:
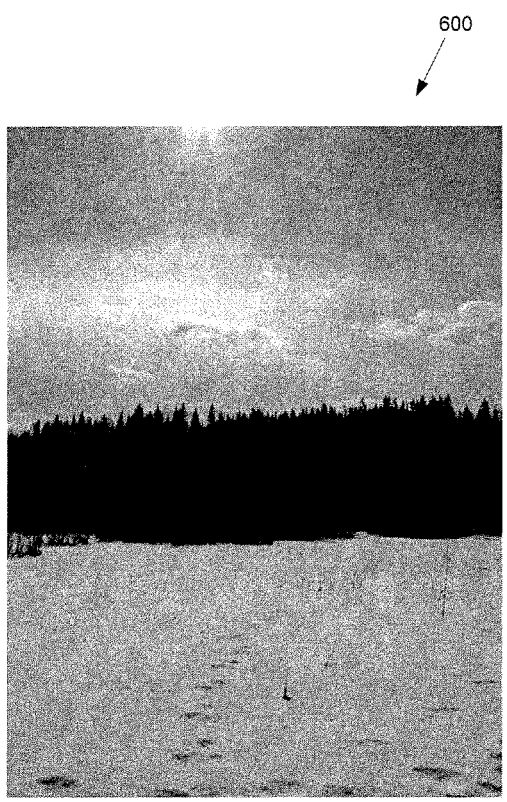
FIG. 6A illustrates an image prior to undergoing the image processing herein.
Figure 6B:
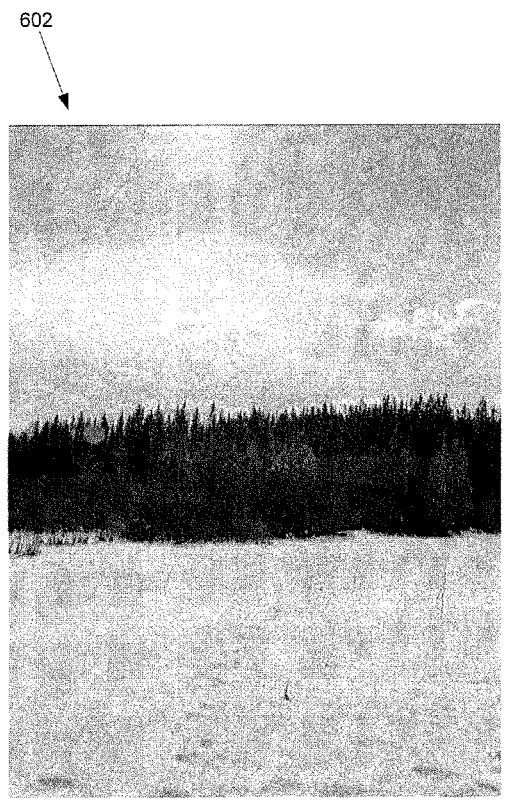
FIG. 6B illustrates an image that has undergone processing in accordance with an embodiment of the invention.

FIG. 6A illustrates an image 600 prior to undergoing the image processing described above. FIG. 6B illustrates an image 602 that has undergone processing in accordance with an embodiment of the invention. One can see that the intensity of the low light portion of image 602 exceeds the intensity of the low light portion of image 600.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:
   (a) computing an intensity image that identifies the intensity of pixels of an input image;
   (b) creating a histogram of the intensity image;
   (c) computing a transformation function, using a first side of the histogram, that can be used to adjust the intensity of a low light portion of the digital image;
   (d) applying the transformation function to individual color components of the digital image; and
   (e) applying a contrast enhancement to each transformed color component,
   wherein the contrast enhancement of a color component is based on computation of a gain map of the color component, said gain map computed using a parameter of the first transformation function.

2. The method of claim 1, wherein (a) comprises determining the intensity of red, green and blue pixels.

3. The method of claim 1, wherein the individual color components comprise red, green and blue color components.

4. The method of claim 1, wherein (c) comprises:
   (i) estimating a maximum number of pixels in a low light portion of the histogram;
   (ii) estimating a width of the low light portion of the histogram by determining a range that has intensity values that exceed a minimum intensity threshold; and
   (iii) computing the transformation function to apply to the low light portion of the digital image.

5. The method of claim 1, wherein (d) further comprises preserving minimum and maximum intensity values of each of the individual color components.

6. The method of claim 1, further including:
   (e) adjusting the contrast of a portion of the digital image other than the low light portion of the digital image.

7. The method of claim 1, wherein the adjustment in (e) is a function of the transformation function.

8. The method of claim 1, further comprising correcting oversaturation of pixels by computing the average between each of the color components, processed using the transformation function, and a corresponding original color component.

9. The method of claim 1 wherein applying a contrast enhancement comprises computing, for each pixel of a color component, a difference between a value of the each pixel and a value of a pixel situated either above or below the each pixel, and computing a difference between the value of the each pixel and of a pixel situated to either the left or right of the each pixel; and said method further comprising;
   computing, for each pixel of the color component, a sum of the value of the each pixel and the value of the pixel situated either above or below the each pixel, and computing a sum between the value of the each pixel and the pixel situated to either the left or right of the each pixel.

10. The method of claim 9, wherein applying the contrast enhancement comprises multiplying the computed differences with corresponding values of the corresponding gain map and averaging the results with the computed sums.

11. A method, comprising:
    (a) computing an intensity image that identifies the intensity of pixels of an input image;
    (b) creating a histogram of the intensity image;
    (c) computing a transformation function, using a first side of the histogram, that can be used to adjust the intensity of a low light portion of the digital image; and
    (d) applying the transformation function to individual color components of the digital image,
    wherein (a) comprises computing an intensity image y(i,j), such that $$y(i, j) = \frac{r(i, j) + b(i, j) + g(i, j)}{3}$$

where i identifies a pixel row and j identifies a pixel column and r(i,j), g(i,j) and b(i,j) are the intensities of red, green and blue color components of the input image.

12. The method of claim 11, wherein the histogram of the intensity image y(i,j) is defined such that $h(m)=nr$ of pixels in the range $[m-0.5; m+0.5]$ with $m=0,\ldots,255$.

13. An apparatus comprising:
    a sensor that captures digital images;
    a processor programmed with computer-executable instructions that, when executed, cause the apparatus to:
    (a) compute an intensity image that identifies the intensity of pixels of the captured digital image;
    (b) create a histogram of the intensity image;
    (c) compute a transformation function, using the histogram, that can be used to adjust the intensity of a low light portion of the captured digital image;
    (d) apply the transformation function to individual color components of the captured digital image; and
    (e) apply a contrast enhancement to each transformed color component,
    wherein the contrast enhancement of a color component is based on computation of a gain map of the color component, said gain map computed using a parameter of the first transformation function.

14. The apparatus of claim 13, wherein the apparatus comprises a digital camera.

15. The apparatus of claim 13, wherein the apparatus comprises a mobile terminal.

16. The apparatus of claim 13, wherein (a) comprises computing an intensity image y(i,j), such that $$y(i, j) = \frac{r(i, j) + b(i, j) + g(i, j)}{3}$$

where i identifies a pixel row and j identifies a pixel column and r(i,j), g(i,j) and b(i,j) are the red, green and blue color components of the captured digital image.

17. The apparatus of claim 13, wherein the histogram of the intensity image y(i,j) is defined such that $h(m)=nr$ of pixels in the range $[m-0.5; m+0.5]$ with $m=0,\ldots,255$.

18. The apparatus of claim 13, wherein (c) comprises:
    (i) estimating a maximum number of pixels in a low light portion of the histogram;
    (ii) estimating a width of the low light portion of the histogram by determining a range that has intensity values that exceed a minimum intensity threshold; and (iii) computing the transformation function to apply to the low light portion of the captured digital image.

19. The apparatus of claim 13, wherein the processor is further programmed with computer-executable instructions to:

(e) adjust the contrast of a portion of the captured digital image other than the low light portion of the captured digital image.

20. A non-transitory computer-readable medium containing computer-executable instructions that, when executed by a processor:

(a) create a histogram that identifies the intensity of components of a digital image;

(b) compute a transformation function, using the histogram, that can be used to adjust the intensity of a low light portion of the digital image;

(c) apply the transformation function to individual color components of the digital image;

(d) adjust the contrast of a portion of the digital image other than the low light portion of the digital image; and (e) apply a contrast enhancement to each transformed color component, wherein the contrast enhancement of a color component is based on computation of a gain map of the color component, said gain map computed using a parameter of the first transformation function.

21. The non-transitory computer-readable medium of claim 20, wherein (b) comprises (i) estimating a maximum number of pixels in a low light portion of the histogram;

(ii) estimating a width of the low light portion of the histogram by determining a range that has intensity values that exceed a minimum intensity threshold; and (iii) computing the transformation function to apply to the low light portion of the captured digital image.

* * * * *